Dec. 16, 1969 W. TAK 3,484,563

SOUND REVERBERATION SYSTEM

Filed Sept. 27, 1966 2 Sheets-Sheet 1

INVENTOR.
WILLEM TAK
BY
AGENT

SOUND REVERBERATION SYSTEM

Filed Sept. 27, 1966 2 Sheets-Sheet 2

INVENTOR.
WILLEM TAK
BY
Frank R. [signature]
AGENT

United States Patent Office 3,484,563
Patented Dec. 16, 1969

3,484,563
SOUND REVERBERATION SYSTEM

Willem Tak, Emmasingel, Eindhoven, Netherlands, assignor, by mesne assignments, to U.S. Philips Corporation, New York, N.Y., a corporation of Delaware Filed Sept. 27, 1966, Ser. No. 582,313
Claims priority, application Netherlands, Oct. 5, 1965, 6512868
Int. Cl. G11b *5/00;* H04m *1/00*
U.S. Cl. 179—100.2 4 Claims

ABSTRACT OF THE DISCLOSURE

A sound reverberation system in which sounds are recorded on a record carrier by a recording head and reproduced by reproducing heads spaced along the carrier and connected to loudspeakers correspondingly spaced along an auditorium. A feedback path connects a reproducing head to a further recording head on the record carrier.

Figure 1:
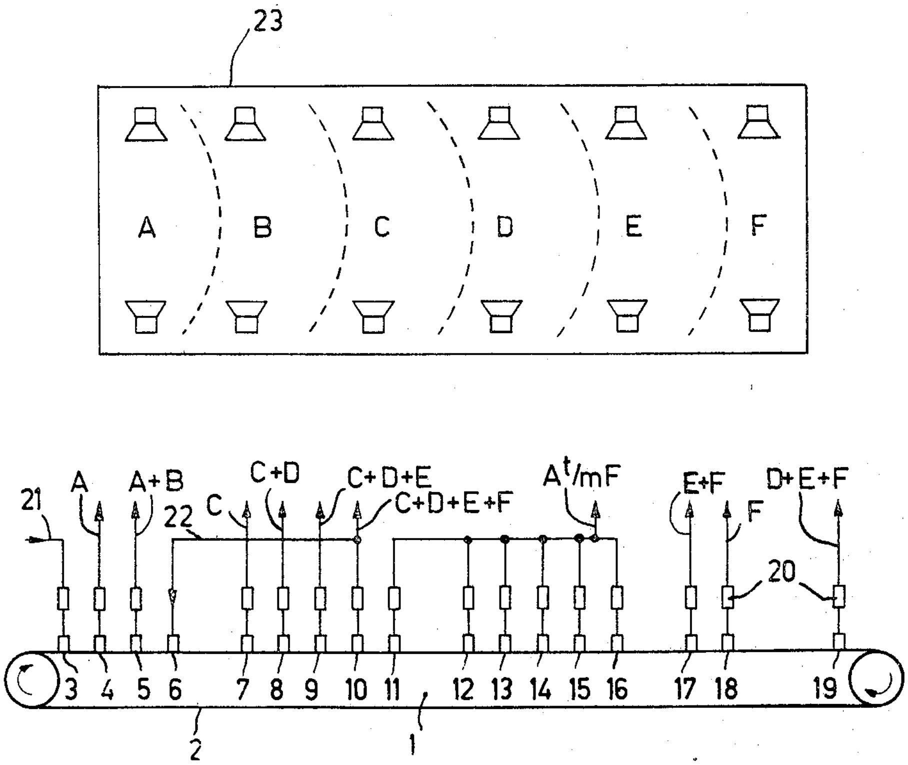

The invention relates to a device for reproducing sound provided with reverberation in a hall which is subdivided into zones and in which loudspeakers are arranged which device comprises a magnetic recording and reproducing system consisting of a preferably uninterrupted record carrier along which a plurality of heads are arranged composed of a recording head followed by a series of substantially equidistant reproducing heads connected with the loudspeakers, the last reproducing head being fed back to the recording head.

When the recording head receives an input signal consisting of a single pulse, each reproducing head reproduces the recorded pulse, though of course in attenuated form and with a delay time which depends upon the position of the relevant reproducing head along the record carrier. If this reproducing head is connected with loudspeakers in a hall, the pulse reproduced sounds in the hall like a single reflection. Several reproducing heads produce reflections the number of which is equal to the number of reproducing heads. In order to raise this number of reflections, the last reproducing head is fed back to the recording head so that the same group of reflections is constantly repeated with intervals corresponding to the relevant reproducing heads.

In case of very large halls, it is desirable to get an impression of the size of the hall. For this purpose, it is required that the first, the second and sometimes the third reflection can be clearly heard separately.

The invention is characterized in that a second recording head followed by a second series of *m* reproducing heads are arranged before the said series, each reproducing head of this second series being connected in order of succession with loudspeakers arranged in a corresponding zone and subsequent zones which form part of a number of *m* zones lying before the said zones in the hall in an order of succession viewed from the front of the hall, while an input signal is applied to the second recording head and the delay time of the first reproducing head of the first series is at least equal to the delay time of the last reproducing head of the second series.

In the first zone of the hall, the first, the second and, if desired, the third reflection are heard, in the second zone the second and, if desired, the third reflection and in the subsequent zones (and, if desired, also in the first and the second zone) a so-called tail of reflections in a close order of succession which are produced by the first series of reproducing heads.

In an embodiment according to the invention, the first recording head is likewise fed with the input signal, while the distance between the first recording head and the first reproducing head of the first series is at least equal to the distance from the second recording head to the $K^{th}$ reproducing head of the second series.

Alternatively, the first recording head may be fed from one of the reproducing heads of the second series.

In order that the listener in a hall may get a reliable sound impression, it is desirable that the reflections of the reverberation pattern should lie close to each other. However, the distance is limited by the dimensions of the reproducing heads in the travelling direction of the record carrier.

A favourable embodiment according to the invention is characterized in that the series of reproducing heads along the record carrier is followed by a third series of reproducing heads, the position of each of these reproducing heads being determined by a distance of an integral multiple of the distance from the recording head to the feedback reproducing head of the first series with respect to points located between the recording head and the reproducing heads of the first series, these points preferably being chosen so that they subdivide the distances between these heads into approximately equal sections which correspond to a fraction of the distance between two consecutive reproducing heads of the first series.

The third series of reproducing heads produces a number of additional reflections which are repeated once more owing to the feedback in the first series of reproducing heads so that the advantage is obtained that the density of the reflections increases, which results in that with reproduction in a concert hall the natural reverberation of this hall is approximately obtained.

However, since gaps still exist at given areas of the sound spectrum reproduced, which gaps can be clearly heard by the listener, the more clearly as he sits in a zone further at the back of the hall, in an embodiment according to the invention, a fourth series of reproducing heads are arranged along the record carrier behind the feedback head, each of these reproducing heads being displaced by an integral multiple of the distance from the recording head to the feedback head in the travelling direction of the record carrier with respect to a given reproducing head of the first series not connected with the $K^{th}$ zone and being connected with those loudspeakers with which this given head is not connected.

This fourth series ensures that the so-called "voids" in the reverberation pattern are filled.

It should be noted that one void in the sound spectrum is of no importance but that a constant re-occurrence of this void is very disturbing for the listener and should be avoided.

In order to obtain an optimum reverberation, the output of each reproducing head should be provided with an attenuator the degree of attenuation of which is such that the signals originating from the reproducing heads constitute a series of uniformly decreasing amplitude—expressed in db—in an order of succession viewed from the recording head.

Figure 2:
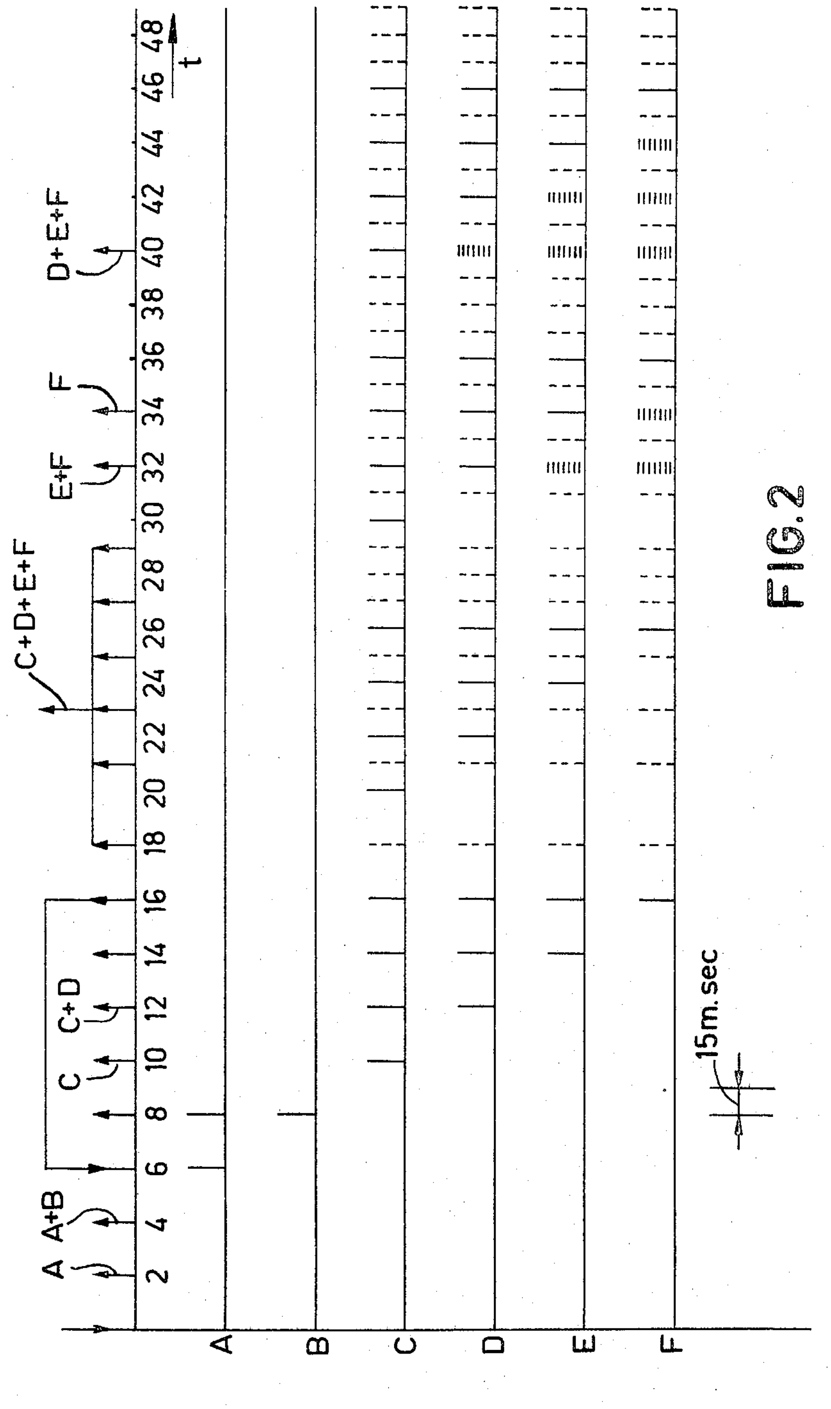

The invention will now be described with reference to the following figures, of which:

FIG. 1 shows diagrammatically a reverberation device according to the invention with the associated hall and FIG. 2 illustrates the reflection pattern of the reverberation in various zones of the hall shown in FIG. 1.

In FIG. 1, the magnetic recording and reproducing system 1 consists of an endless magnetic tape 2 which is driven in the direction of the arrow and along which a plurality of heads are arranged in the order of succession: second recording head 3, second series of reproducing heads 4 and 5, first recording head 6, first series of reproducing heads 7 to 10, third series of reproducing heads 11 to 16, fourth series of reproducing heads 17 to 19. The sound signal 21 is applied to the recording head 3. The last reproducing head 10 of the first series is fed back through a conductor 22 to the recording head 6. All reproducing heads are connected through an attenuator 20 of suitable dimensions with loudspeakers arranged in a hall 23. This hall (shown diagrammatically) is subdivided into zones A, B, C, D, E and F. The loudspeaker or group of loudspeakers associated with a given zone is provided with the same reference as the zone itself. The front of the hall adjoins to the first zone A. In order of succession, the loudspeakers of zone A are connected with the reproducing heads 4 and 5, the loudspeakers of zone B with the reproducing head 5, those of zone C with the reproducing heads 7 to 10, those of zone D with the reproducing heads 8 to 10 and with reproducing head 19, those of zone E with the reproducing heads 9 and 10 and with the reproducing heads 17 and 19 and those of zone F with the heads 17 to 19. Moreover, the reproducing heads 11 to 16 are connected with all zones.

FIG. 2 illustrates the reflections which should be available in a given zone when the input signal 21 consists of a single pulse, that is to say for each zone in the order of succession viewed in downward direction. The relative distance of the reproducing heads 7 to 10 is 30 milliseconds, the distance from the recording head 6 to the feedback head 10 is 150 milliseconds. The reflections produced by the first sequence of reproducing heads 7 to 11 are indicated with full lines. A pattern of four reflections is constantly repeated. The second sequence of reproducing heads produce in zone A the significant reflections, whilst in zone B the head 5 produces a single reflection. The third sequence 11 to 16 produces the additional reflections which are indicated with dotted lines. These reflections are displaced by 15 milliseconds with respect to the reflections originating from the first sequence of reproducing heads. At various places, the "voids" in the reflection pattern are filled with reflections (indicated with broken lines) originating from the fourth sequence of reproducing heads in the following manner:

In zone D the reflections of the reproducing head 7 are not reproduced. In this case, a sequence of voids would appear having a delay time of 20, 30, 40×15 milliseconds. At the first delay time—20×15 milliseconds—it is not possible to provide a reproducing head, since its dimensions are not suitable for this purpose; consequently, the void subsists in this case. At the following void, there is no space available either, but at a delay time of 40×15 milliseconds the reproducing head 19 may be arranged for filling this void and the subsequent voids. In zone E, the signals originating from the reproducing heads 7 and 8 are not present. The voids are filled with reflections originating from the reproducing heads 17 and 19. The reproducing head 18 further fills the voids in the zone F.

The so-called tail of the pulse pattern begins for the zone C at a delay time of 300 milliseconds and for the zone F at a delay time of 465 milliseconds and from this value it is quite regular with a reflection density of 15 milliseconds.

The reflection pattern reproduced in zone C may also be imparted both to zone A and to zone B.

What is claimed is:

1. A device for reproducing sound provided with reverberation in a hall which is subdivided into at least two successive groups of zones and in which at least two corresponding groups of loudspeakers are arranged, said device comprising a preferably uninterrupted record carrier, a first recording head adjacent said carrier, a first series of substantially equidistant reproducing heads adjacent said carrier following said first recording head and connected with the corresponding first group of loudspeakers, feedback means connecting the last reproducing head of the first series to the first recording head, a second recording head arranged before said first recording head, a second series of *m* reproducing heads arranged between said first and said second recording heads, each of the reproducing heads of this second series being connected in order of succession with the second group of loudspeakers arranged in a corresponding zone and in the following zones which form part of a number of *m* zones lying in front of the aforementioned zones in the hall in an order of succession viewed from the front of the hall, said second recording head provided with means for receiving an input signal, and wherein the delay time of the first reproducing head of the first series is at least equal to the delay time of the last reproducing head of the second series.

2. A device as claimed in claim 1, characterized in that behind the first series of reproducing heads there are arranged along the record carrier a third series of reproducing heads connected to a third group of loudspeakers, the position of each of the third series of reproducing heads being determined by a distance of an integral multiple of the distance from the first recording head to the last reproducing head of the first series with respect to points located between the first recording head and the reproducing heads of the first series, said points subdividing the distances between the heads of the third series into approximately equal sections corresponding with a fraction of the distance between two consecutive reproducing heads of the first series.

3. A device as claimed in claim 2, characterized in that behind the third series of heads there are arranged along the record carrier a fourth series of reproducing heads, each of the reproducing heads of the fourth series being displaced by an integral multiple of the distance from the first recording head to the last reproducing head of the first series in the travelling direction of the record carrier with respect to a given reproducing head of the first series not connected with the $K^{th}$ zone, said fourth series being connected with those loudspeakers with which this given reproducing head is not connected.

4. A device as claimed in claim 1, characterized in that the output of each reproducing head is provided with an attenuator the degree of attenuation of which is such that the signals originating from the reproducing heads constitute a sequence of uniformly decreasing amplitude—expressed in db—in an order of succession viewed from the recording head.

References Cited

UNITED STATES PATENTS 2,931,862 4/1960 Vermeulen et al. ______ 179—1

BERNARD KONICK, Primary Examiner

ROBERT S. TUPPER, Assistant Examiner

U.S. Cl. X.R.

179—1, 100.1